United States Patent Office 3,364,197
Patented Jan. 16, 1968

3,364,197
2-HYDROXYETHYL 6,8-DIDEOXY-6-(4-SUBSTI-TUTED-L-2-PYRROLIDINECARBOXAMIDO)-7 - O - METHYL - 1 - THIO-D-ERYTHRO-α-D-GALACTO-OCTOPYRANOSIDES AND PROCESS FOR PRODUCING THEM
Herman Hoeksema, Menlo Park, Calif., assignor to The Upjohn Company, Kalamazoo, Mich., a corporation of Delaware
No Drawing. Continuation-in-part of application Ser. No. 359,446, Apr. 13, 1964. This application Dec. 28, 1965, Ser. No. 517,137
6 Claims. (Cl. 260—210)

ABSTRACT OF THE DISCLOSURE 2-hydroxyethyl 6,8-dideoxy - 6 - (4-substituted-L-2-pyrrolidinecarboxamido)-7-O-methyl - 1 - thio-D-erythro-α-D-galacto-octopyranosides are produced by acylating 2-hydroxyethyl-6-amino 6,8-dideoxy - 7 - O - methyl-1-thio-D-erythro-α-D-galacto-octopyranoside with a mixed anhydride one acyl group of which is the 4-substituted-L-2-pyrrolidine carboxacyl. The novel compounds have antibacterial properties.

This application is a continuation-in-part of my application Ser. No. 359,446, filed Apr. 13, 1964, now abandoned.

This invention relates to novel compounds and to processes for preparing them, and is particularly directed to 2-hydroxyethyl 6,8-dideoxy-6-(4-substituted-L-2-pyrrolidinecarboxamido)-7-O-methyl - 1 - thio-D-erythro-α-D-galacto-octopyranosides and to processes whereby they are produced.

The novel compounds of the invention can be represented by the following structural formula:

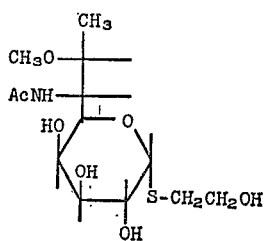

wherein Ac is the acyl radical of a 4-substituted-L-2-pyrrolidinecarboxylic acid of the formula:

wherein $R_1$ and $R_2$ are alkylidene of not more than 20 carbon atoms (including methylene), advantageously not more than 8 carbon atoms, cycloalkylidene of from 3 to not more than 8 carbon atoms, and aralkylidene of not more than 12 carbon atoms, advantageously not more than 8 carbon atoms; and $R_3$ is hydrogen or $HR_2$.

The novel compounds of the invention, Formula I, as well as other related compounds, can be prepared by acylating β-hydroxyethyl thiocelestosaminide (B-HTC), a compound of the formula:

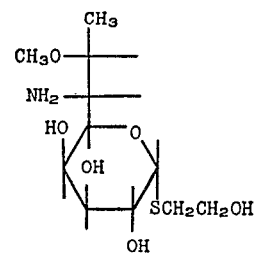

with an acid of Formula A or B or with an acid readily convertible thereto, for example, acids of Formulas C, D and E, infra. The acylation is effected either by direct acylation with the acid or by first converting the acid to an acid chloride or other acid halide, or to its anhydride, according to methods already well known in the art. For example, when an acid of Formula A is used as the starting acid, a novel compound of Formula I-A is obtained. When this compound or the starting acid (Formula A) is hydrogenated with a catalyst effective to saturate an olefinic double bond, a compound of Formula I-B is obtained as a mixture of cis and trans epimers according to the formulas:

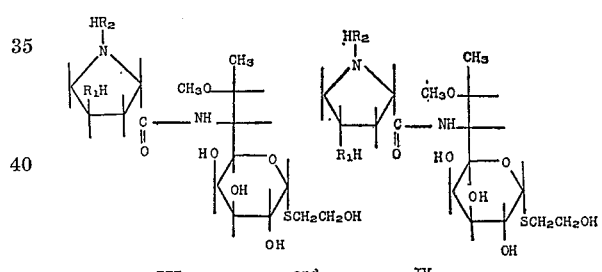

which, if desired, can be separated by counter current distribution or chromatography.

Advantageously, a mixed anhydride of the 4-substituted-L-2-pyrrolidinecarboxylic acid and a less reactive acid, i.e., an acid whose acyl group in the mixed anhydride does not react preferentially with the starting compound of Formula II, is used. Suitable such acids are the hypothetical ethyl hydrogen carbonate and like hypothetical monoesters of carbonic acid such as the lower-alkyl and loweralkoxyalkyl hydrogen carbonates, p-toluenesulfonic acid and the like. These mixed anhydrides are obtained by reacting the 4-substituted-L-2-pyrrolidinecarboxylic acid with an acyl halide of the non-reactive acid, for example, ethylchlorocarbonate, propylchloroformate, t-butylchloroformate, or p-toluenesulfonyl chloride. The formation of these mixed anhydrides and the acylation of the compound for Formula II with them are advantageously effected in the presence of an acid binding agent, for example, pyridine, triethylamine, or other basic tertiary amines. The acylation is ordinarily carried out at room temperature (25–30° C.) but can be carried out at temperatures up to about 100° C. and down to about —10° C. Lower temperatures, e.g., between about —10° C. and 25° C. are most advantageously used with the anhydrides and acid halides.

When $R_3$ ($HR_2$) in Formula B is hydrogen, it can be replaced by suitable alkylation or like procedure. Advantageously, this replacement is effected by reacting the compound according to Formula B, wherein $R_3$ is hydrogen with an oxo compound (an aldehyde or a ketone) and hydrogenating the resulting adduct with a catalyst effective to saturate an olefinic double bond. Either platinum or palladium can be used as the catalyst. Suitable oxo compounds have the formula $R_4R_5CO$ where $R_4R_5C=$ is the same as $R_2$ given above. Examples of suitable oxo compounds are formaldehyde, acetaldehyde, propionaldehyde, butyraldehyde, acetone, isobutyl methyl ketone, benzaldehyde, phenylacetaldehyde, hydrocinnamaldehyde, acetophenone, propiophenone, butyrophenone, 3-methyl-4-phenyl-2-butanone, 2-methyl-5-phenyl-3-pentanone, 3-cyclopentanepropionaldehyde, cyclohexaneacetaldehyde, cycloheptanecarboxaldehyde, 2,2 - dimethylcyclopropylacetaldehyde, 2,2 - dimethylcyclopropyl methyl ketone, cyclopentyl methyl ketone, cyclobutyl methyl ketone, cyclobutanone, cyclohexanone, 4-methylcyclohexanone, and the like.

The starting compounds of Formula II are obtained from celesticetin according to U.S. Patent 3,208,996. The starting acid of Formula A can be prepared by reacting a 4-oxo compound of the formula:

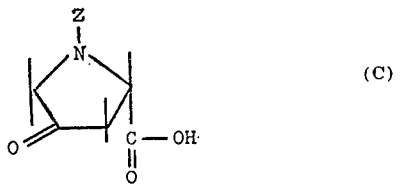

wherein Z is a protective hydrocarbyloxycarbonyl group which is removable by hydrogenolysis, trityl, i.e., triphenylmethyl, diphenyl(p-methoxyphenyl)methyl, bis-(p-methoxyphenyl)phenylmethyl, benzyl, or p-nitrobenzyl, with a Wittig agent, e.g., an alkylidenetriphenylphosphorane [see e.g., Wittig et al., Ber., 87, 1348 (1954); Trippett, Quarterly Reviews, XVII, No. 4, p. 406 (1963)]. Examples of hydrocarbyloxycarbonyl groups (Z) are tertiary-butoxycarbonyl; benzyloxycarbonyl groups of the formula:

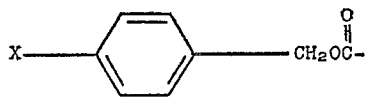

wherein X is hydrogen, nitro, methoxy, chloro, or bromo, for example, carbobenzoxy, p-nitrocarbobenzoxy, p-bromo-, and p-chlorocarbobenzoxy; and phenyloxycarbonyl groups of the formula:

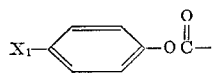

wherein $X_1$ is hydrogen, allyl, or alkyl of not more than 4 carbon atoms, such as phenyloxycarbonyl, p-tolyloxycarbonyl, p-ethylphenyloxycarbonyl, and p-allylphenyloxycarbonyl and the like.

In carrying out this process the 4-oxo-L-2-pyrrolidinecarboxylic acid (Formula C) is added to a freshly prepared Wittig reagent. The Wittig reagents herein used can be generally represented by the following formula:

wherein $R_1$ is as given above. These Wittig reagents are prepared by reacting an alkyl, cycloalkyl or aralkyltriphenylphosphonium halide with a base such as sodamide, or sodium or potassium hydride, or the sodium or potassium metalate of dimethyl sulfoxide, and the like.

For example, the elimination of hydrogen halide from alkyltriphenylphosphonium halide, produces alkylidenetriphenylphosphorane. [The preparation of phosphoranes is discussed in detail by Trippett, Quart. Rev., XVII, No. 4, p. 406 (1963)]. The reaction is generally carried out in an organic solvent, such as benzene, toluene, ether, dimethylsulfoxide, tetrahydrofuran, or the like, at temperatures between 10° C. and the reflux temperature of the reaction mixture. The thus-obtained product, a 4-alkylidene-, 4-cycloalkylidene-, or 4-aralkylidene-1-protected-L-proline which has the following formula:

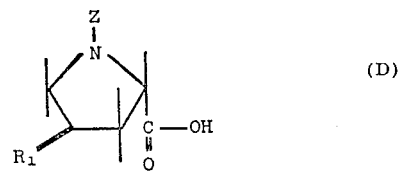

is recovered from the reaction mixture in a conventional manner, generally by extraction from aqueous solutions of the reaction mixture. The crude product can be purified by conventional means, such as recrystallization, chromatography or formation and recrystallization of easily formed derivatives such as amine salts of the amino acid, e.g., the dicyclohexylamine salt, and the like, and liberating the amino acids from such compounds. By hydrogenating an acid of Formula D in the presence of a catalyst, e.g., platinum, which is effective to saturate a double bond, but which is ineffective to effect hydrogenolysis, a compound of the following formula:

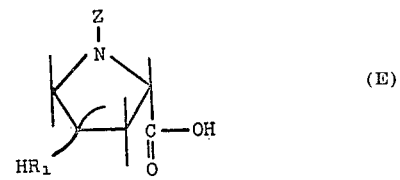

is obtained. Platinum deposited on a carrier, e.g., carbon or an anion exchange resin like Dowex-1, a cross-linked polystyrene trimethylbenzylammonium resin in the hydroxide cycle is suitable. If desired, the starting compounds of Formula II can be acylated with acids of Formula C, D or E to form compounds I–C, I–D and I–E, respectively, i.e., compounds of Formula I wherein Ac is the acyl radical of acids C, D and E, respectively. Compound I–C can then be converted to compound I–D by treatment with a Wittig reagent and compound I–D hydrogenated to compound I–E by the procedures given above. The hydrogenation, both of the acid D and the acylate I–D, gives a mixture of cis and trans epimers which, if desired, can be separated by counter current distribution or chromatography. The starting acids of Formula B in which $R_3$ is hydrogen are obtained when an acid of Formula D or E is subjected to hydrogenolysis over a palladium catalyst, e.g., palladium on carbon. Likewise, compounds of Formula I–D and I–E are converted to compounds of Formula I–B in which $R_3$ is hydrogen by the same process. The starting acids of Formula B in which $R_3$ is hydrogen as well as compounds of Formula I–B in which $R_3$ is hydrogen can be converted respectively to compounds of Formulas B and I–B in which $R_3$ is $HR_2$ by the procedures given above. The starting acids of Formula A are obtained by treating an acid of Formula D with hydrogen bromide in acetic acid to remove the Z group and then replacing the N-hydrogen with an $HR_2$ group by the procedure given above. Compounds of Formula I–D and I–E are converted to compounds of Formula I–A and I–B, respectively, by the same process.

Some of the acids of Formula B can be obtained by the acid hydrolysis of microbiologically produced lincomycin and lincomycin analogs of the formula:

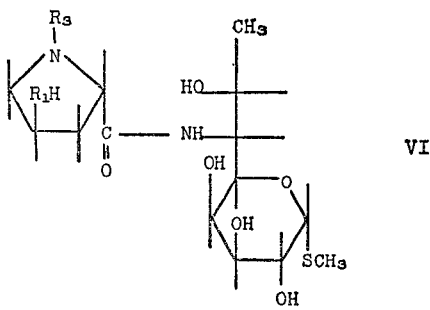

For example, lincomycin (Formula VI, $R_3$ is methyl and $R_1H$ is propyl) which is obtained as an elaborative product of an actinomycetes fermentation according to U.S. Patent 3,086,912 yields on acid hydrolysis an acid of Formula B wherein $R_3$ is methyl and $R_1H$ is propyl. Similarly, lincomycin B ($R_3$ is methyl and $R_1H$ is ethyl), elaborated in the same fermentation, yields an acid of Formula B wherein R is methyl and $R_1H$ is ethyl. Also, lincomycin D ($R_3$ is hydrogen and $R_1H$ is propyl) and lincomycin G ($R_3$ is hydrogen and $R_1H$ is ethyl), which are obtained when the same fermentation is conducted in the presence of added α-MTL, methyl 6-amino-6,8-dideoxy - D - erythro - 1-thio-α-D-galacto-octopyranoside (U.S. Patent 3,179,566), yield acids of Formula B wherein (1) $R_3$ is hydrogen and $R_1H$ is propyl, and (2) $R_3$ is hydrogen and $R_1H$ is ethyl, respectively.

The compounds of Formulas I–A and I–B exist either in the protonated or non-protonated forms according to the pH of the environment. When the protonated form is intended the compound is qualified as an acid-addition salt and when the non-protonated form is intended it is qualified as the free base. The free bases can be converted to stable acid-addition salts by neutralizing the free base with the appropriate acid to below about pH 7.0 and advantageously to about pH 2 to pH 6. Suitable acids for this purpose include hydrochloric, sulfuric, phosphoric, thiocyanic, fluosilicic, hexafluoroarsenic, hexafluorophosphoric, acetic succinic, citric, lactic, maleic, fumaric, pamoic, cholic, palmitic, mucic, camphoric, glutaric, glycolic, phthalic, tartaric, lauric, stearic, salicylic, 3-phenylsalicyclic, 5 - phenylsalicylic, 3 - methylglutaric, orthosulfobenzoic, cyclohexanesulfamic, cyclopentanepropionic, 1,2-cyclohexanedicarboxylic, 4-cyclohexanecarboxylic, octadecenylsuccinic, octenylsuccinic, methanesulfonic, benzenesulfonic, helianthic, Reinecke's, dimethyldithiocarbamic, cyclohexylsulfamic, hexadecylsulfamic, octadecylsulfamic, sorbic, monochloroacetic, undecylenic, 4'-hydroxyazobenzene-4-sulfonic, octodecylsulfuric, picric, benzoic, cinnamic, and like acids.

The acid-addition salts can be used for the same purposes as the free base or they can be employed to upgrade the same. For example, the free base can be converted to a water-insoluble salt, such as the picrate, which can be subjected to purification procedures, for example, solvent extractions and washings, chromatography, fractional liquid-liquid extractions, and crystallization and then used to regenerate the free base form by treatment with alkali or to make a different salt by metathesis. Or the free base can be converted to a water-soluble salt, such as the hydrochloride or sulfate, and the aqueous solution of the salt extracted with various waterimmiscible solvents before regenerating the free base form by treatment of the thus-extracted acid solution or converted to another salt by metathesis. The free bases of Formulas I–A and I–B can be used as buffers or as antacids. The compounds of Formula I react with isocyanates to form urethanes and can be used to modify polyurethane resins. The long chain compounds, i.e., where $HR_2$ is alkyl of from 8 carbon atoms up, have surface active properties and can be used as wetting and emulsifying agents. The thiocyanic acid addition salt when condensed with formaldehyde forms resinous materials useful as pickling inhibitors according to U.S. Patents 2,425,320 and 2,606,155. The free bases also make good vehicles for toxic acids. For example, the fluosilicic acid addition salts are useful as mothproofing agents according to U.S. Patents 1,915,334 and 2,075,359 and the hexafluoroarsenic acid and hexafluorophosphoric acid addition salts are useful as parasiticides according to U.S. Patents 3,122,536 and 3,122,552.

The close analogues of celesticetin, i.e., where $—R_1H$ is cis or trans alkyl of not more than 8 carbon atoms; and $R_3$ is methyl or ethyl; have antibacterial properties, and some are comparable or superior to celesticetin and can be used for the same purposes as celesticetin. The other analogues and isomers have similar antibacterial properties but to a lesser degree and can be used for the same purposes as celesticetin where larger amounts are not objectionable.

The following examples are illustrative of the process and products of the present invention but are not to be construed as limiting. The parts and percentages are by weight and the solvent ratios are by volume unless otherwise specified.

EXAMPLE 1

2-hydroxyethyl trans - 6,8-dideoxy-6-(1-methyl-4-propyl-L - 2 - pyrrolidinecarboxamido)-7-O-methyl-1-thio-D-erythro-α-D-galacto-octopyranoside To 4.16 gm. (0.02 mole) of trans-1-methyl-4-propyl-L-proline in 225 ml. of dry acetone, 11.2 ml. (0.08 mole) of triethylamine and 2.30 g. (0.02 mole) of propylchloroformate were added. After 1 hour of vigorous stirring, the mixture was filtered and the filtrate was added at 5° C. to 5.94 g. (0.02 mole) of β-hydroxyethyl thiocelestosaminide (Formula II) in 50 ml. of water. After 1 hour of standing at 0° C., the solution was evaporated to an aqueous concentrate in vacuo which was then extracted 3 times with 20 ml. portions of chloroform. The extract was washed with 20 ml. of water and the chloroform was removed by evaporation in vacuo. The residual syrup crystallized on standing in the refrigerator. A 50 mg. quantity of this material was dissolved in 0.6 ml. of 6 N hydrochloric acid, diluted with 23 ml. of acetone and 5 ml. of ether, to yield white, solvated crystals melting at approximately 50° C., and showing infrared absorption at 1530 and 1650 cm.$^{-1}$.

Elemental analysis.—Calculated for $C_{20}H_{38}N_2O_7S \cdot HCl$ (non-solvate): C, 49.32; H, 8.07; N, 5.75; S, 6.58. Found: C, 50.23; H, 8.47; N, 6.55; S, 7.23.

Streptococcus hemolyticus infected mice were protected orally with a $CD_{50}$ of 16 (11–21) mg./kg. of the above compound.

The 1-methyl-4-propyl-L-proline used in the above example was prepared as follows:

A solution of two grams of lincomycin hydrochloride, prepared as in Example 2 of U.S. Patent 3,086,912, in 50 ml. of 6 N hydrochloric acid was refluxed for ½ hour and then evaporated to dryness. The residue was dissolved in 20 ml. of water and extracted twice with 10 ml. portions of chloroform. To the aqueous phase was added 60 ml. of water and the resulting solution was extracted twice with 20 ml. portions of 1-butanol. The aqueous phase was evaporated to dryness in vacuo and the residue was dissolved in 20 ml. of ethanol. The ethanol solution was treated with carbon and to the filtrate was added 100 ml. of ether. A gummy precipitate which formed was removed by filtration and the filtrate was again decolorized with carbon. To the decolorized filtrate was added 1000 ml. of ether and the solution was cooled in a refrigerator. The crystals of 1-methyl-4-propyl-L-proline hydrochloride hemihydrate which formed were collected by filtration; 0.650 gm.

Elemental analysis.—Calculated for $C_9H_{18}NO_2Cl$.

½H₂O: C, 49.87; H, 8.84; N, 6.46; Cl, 16.36; O, 18.46; Eq. wt. 216.7. Found: C, 49.35; H, 8.55; N, 6.75; Cl, 16.96; O (diff.) 18.39.

Eq. wt. 216 (titration); pK$_a$'s of 2.4 and 10.
Optical rotation: $[\alpha]_D^{25}$ —56° (c., 0.7002 in water)
Melting point: 187–189° C.

In place of the 1-methyl-4-propyl-L-proline used in the above example, there may be substituted other 4-substituted-L-prolines according to Formula A, B, C, D, and E. Representative such acids and methods for their preparation are given in the following examples.

EXAMPLE 2

A. *4-methylene-1-carbobenzoxy-L-proline and the cyclohexylamine salt thereof*

Sodamide was prepared in the usual manner from 1.29 g. (56 mmole) of sodium in 170 ml. of liquid ammonia. Twenty grams (56 mmole) of methyl triphenylphosphonium bromide was added, the mixture was stirred at room temperature (24–26° C.) for one hour, and the ammonia was evaporated.

To the residue was added 150 ml. of a mixture of equal amounts of ether and tetrahydrofuran. The mixture was heated at reflux for a period of 5–7 minutes, cooled to 26° C. and thereto was added 2.63 g. (10 mmole) of 4-keto-1-carbobenzoxy-L-proline [Patchett et al., J. Am. Chem. Soc., 79, 185 (1957)] in 20 ml. of tetrahydrofuran. After heating the reaction mixture under reflux for 2.5 hours, the mixture was cooled, diluted with ether and aqueous sodium bicarbonate solution and filtered; the ether was discarded. The filtrate was acidified, extracted with ether and the extracts were evaporated to give 2.2 g. of crude 4-methylene-1-carbobenzoxy-L-proline.

The crude material (2.2 g.) was dissolved in ether and 1.8 ml. of dicyclohexylamine was added; 3.25 g. (74.4% yield) of 4-methylene-1-carbobenzoxy-L-proline dicyclohexylamine salt crystallized rapidly. The crystals after drying melted at 154–158° C.; rotation $[\alpha]_D$ +0.56° (c., .795, chloroform).

B. *Cis-4-methyl-L-proline*

A suspension of 20.9 g. of 4-methylene-1-carbobenzoxy-L-proline dicyclohexylamine salt in 308 ml. of 5% aqueous sodium hydroxide and 308 ml. of ether was shaken until all of the solid had dissolved. The layers were separated and each was back-washed with fresh solvent. The aqueous solutions were combined, acidified with dilute acid and extracted with ether. Evaporation of the solvent gave 4-methylene-1-carbobenzoxy-L-proline; yield, 12.1 g. (97.5%). This acid was dissolved in 250 ml. of methanol and hydrogenated over 2 g. of 10% palladium-on-carbon catalyst under 40 lbs. pressure of hydrogen for 2.5 hours. Filtration and evaporation of the reaction mixture gave cis-4-methyl-L-proline which was crystallized from methanol-ether; it melted at 231–233° C.

Further recrystallization from acetonitrile gave pure cis-4-methyl-L-proline melting at 238–240° C.

Further recrystallization from acetonitrile gave pure cis-4-methyl-L-proline melting at 238–240° C.

*Analysis.*—Calcd. for C₆H₁₁NO₂: C, 55.79; H, 8.59; N, 10.85. Found: C, 55.39; H, 8.42; N, 10.78.

C. *Cis-1,4-dimethyl-L-proline and the hydrochloride thereof*

Six milliliters of formalin and 1 g. of palladium-on-carbon catalyst (10% palladium) were added to the hydrogenated reaction mixture obtained in Part B and hydrogenation was continued for 2 hours. Thereafter the mixture was filtered to remove the catalyst and the solvent was removed by distillation. The resulting oily residue of 7.4 g., chiefly cis-1,4-dimethyl-L-proline, did not crystallize. It was dissolved in methanol and ether saturated with hydrogen chloride. Crystalline cis-1,4-dimethyl-L-proline hydrochloride precipitated, which was recovered by filtration and dried. The dried material had a melting point of 206 to 215° C. and after several recrystallizations from methanol and ether cis-1,4-dimethyl-L-proline·HCl of melting point 213–216° C. was obtained.

*Analysis.*—Calcd. for C₇H₁₄ClNO₂: C, 46.80; H, 7.85; N, 7.80. Found: C, 47.54; H, 7.81; N, 8.00.

EXAMPLE 3

A. *4-propylidene-1-carbobenzoxy-L-proline and dicyclohexylamine salt*

Sodium hydride (3.8 g.) was warmed with 75 ml. of dimethylsulfoxide at a temperature of 70–75° C. until the reaction was complete. After cooling to 20° C., 30.8 g. of propyltriphenylphosphonium bromide was added, and the resulting red solution was stirred for 30 minutes to insure complete reaction. A solution of 5.2 g. of 4-keto-1-carbobenzoxy-L-proline in 15 ml. of dimethylsulfoxide was added over a period of 15 minutes, and the resulting mixture was stirred for 20 minutes at 26° C. and then at 70° C. for 4 hours. The reaction mixture was cooled, 100 ml. of 5% aqueous potassium bicarbonate and 100 ml. of water added, and filtered. The filtrate was washed twice with 150 ml. portions of ether and the ether was discarded after back extracting with bicarbonate. The bicarbonate solutions were combined, diluted with 200 ml. of water, and acidified with 4 N hydrochloric acid. The acidified mixture was extracted with three 200-ml. portions of ether. The combined ether extracts were washed with three 50-ml. portions of saturated aqueous sodium bisulfite, then with water and dried over anhydrous sodium sulfate. Evaporation of the solvent gave 5.7 g. of a solid residue which was 4-propylidene-1-carbobenzoxy-L-proline.

This residue was dissolved in 18 ml. of acetonitrile and treated with 2.8 ml. of dicyclohexylamine. The crystalline dicyclohexylamine salt, 5.2 g. (55% yield), melted at 154–157° C. After three recrystallizations from acetonitrile, an analytical sample was obtained which melted at 164–166° C. and had a rotation of $[\alpha]_D$ —8° (c.=0.3898 g./100 ml., CHCl₃).

*Analysis.*—Calcd. for C₂₈H₄₂N₂O₄: C, 71.45; H, 9.00; N, 5.95. Found: C, 71.77; H, 9.39; N, 5.1.

B. *Cis-4-propyl-L-proline*

Eight grams (17 mmoles) of the dicyclohexylamine salt of 4-propylidene-1-carbobenzoxy-L-proline was shaken with excess 1.5 N sodium hydroxide solution and ether until solution was complete. The layers were separated and each one was back-washed. The aqueous alkaline layer was combined with the back-wash from the ether layer and acidified with 4 N hydrochloric acid. The mixture was extracted with ether and the ether extracts were combined and evaporated to give 4.8 g. (97.8%) of 4-propylidene-1-carbobenzoxy-L-proline as an oil. This oil was hydrogenated in 200 ml. of methanol over 1 g. of 10% palladium-on-charcoal catalyst for a period of 2 hours. Since the reaction appeared incomplete from thin-layer chromatographic analysis, hydrogenation was continued for 2 hours after 0.5 g. of fresh catalyst had been added. The mixture was thereupon filtered and the filtrate was evaporated to a residue which was crystallized from methanol-ether: melting point about 222° C. with decomposition. This product consisted of cis-4-propyl-L-proline with a trace of trans-4-propyl-L-proline.

C. *Cis-1-methyl-4-propyl-L-proline*

To the hydrogenation mixture from a hydrogenation conducted as in Part B was added 5 ml. of formalin. The mixture was hydrogenated for 2.5 hours at 45 lbs. pressure of hydrogen in the presence of an additional ½ g. of 10% palladium-on-carbon catalyst. The mixture was cooled, filtered and the filtrate was evaporated to dryness. The residue was dissolved in methanol, converted to the hydrochloride by treatment of the methanol solution with an ether-hydrogen chloride solution and crystallized from methanol-ether to give 2.82 g. (80%) of cis-1-methyl-4-propyl-L-proline hydrochloride of melting point 201–206° C.; rotation $[\alpha]_D$ —60° (c.=0.8344, $H_2O$).

*Analysis.*—Calcd. for $C_9H_{17}NO_2 \cdot HCl$: C, 52.04; H, 8.73; N, 6.75. Found: C, 51.72; H, 8.96; N, 6.44.

This sample contained less than 2% of trans-1-methyl-4-propyl-L-proline.

Treating cis-1-methyl-4-propyl-L-proline hydrochloride in aqueous solution with silver oxide, removing the thus-formed silver chloride and excess silver oxide by filtration, and evaporating the filtrate gave cis-1-methyl-4-propyl-L-proline in the zwitterion form.

EXAMPLE 4

A. *4-butylidene-1-carbobenzoxy-L-proline and the cyclohexylamine salt thereof*

Sodium hydride (19 g.) as a 53% suspension in mineral oil was warmed with 350 ml. of dimethylsulfoxide at a temperature of 70–75° C. until the reaction was complete (about 30 minutes). After cooling to 32° C., 16.2 g. of butyl triphenylphosphonium bromide was added, and the resulting reaction mixture was stirred for 1 hour to insure complete reaction. A solution of 26 g. of 4-keto-1-carbobenzoxy-L-proline in 100 ml. of dimethylsulfoxide was added, and the resulting mixture was heated at 70° C. for 3 hours. The reaction mixture was cooled to 25° C. and 1 liter of 2.5% aqueous potassium bicarbonate added. This mixture was washed twice with 700 ml. portions of ether and the ether was discarded after back extracting with 150 ml. of 2.5% aqueous potassium bicarbonate. The bicarbonate solutions were combined and acidified with 4 N hydrochloric acid. The acidified mixture was extracted with four 500-ml. portions of ether. The combined ether extracts were washed successively with 250 ml. of water, three 250-ml. portions of saturated aqueous sodium bisulfite, and 250 ml. of water, and dried over anhydrous sodium sulfate. Evaporation of the solvent under vacuum gave 24 g. of an oily residue which was 4-butylidene-1-carbobenzoxy-L-proline.

This residue was dissolved in 31 ml. of acetonitrile and treated with 18 ml. of dicyclohexylamine and refrigerated. The crystals were collected, washed with acetonitrile and dried in vacuo giving 21 g. (46.8%) of the crystalline dicyclohexylamine salt melting at 136–140° C. After two recrystallations from acetonitrile, an analytical sample was obtained which melted at 142–144° C. and had a rotation of $[\alpha]_D$ —4° (c.=0.99, $CHCl_3$).

*Analysis.*—Calcd. for $C_{29}H_{44}N_2O_4$: C, 71.86; H, 9.15; N, 5.78. Found: C, 71.69; H, 9.30; N, 5.74.

Ten grams of the dicyclohexylamine salt of 4-butylidene-1-carbobenzoxy-L-proline was shaken with ether and excess 5% aqueous potassium hydroxide until no solid remained. The layers were separated and each one was backwashed. The aqueous alkaline layer was combined with the backwash from the ether layer and acidified with 4 N hydrochloric acid. The mixture was repeatedly extracted with ether and the ether extracts were combined, dried over sodium sulfate, and evaporated in vacuo to give 6.3 g. (93%) of 4-butylidene-1-carbobenzoxy-L-proline as an oil.

B. *4-butyl-1-carbobenzoxy-L-proline*

The oil from Part A was hydrogenated in 200 ml. of methanol over 2.1 g. of 10% platinum on Dowex-1 catalyst under 40 lbs. hydrogen pressure. The catalyst was removed by filtration and the filtrate evaporated to yield 6.3 g. of 4-butyl-1-carbobenzoxy-L-proline as an oil. The product contained about 2 parts cis-4-butyl-1-carbobenzoxy-L-proline to each part of trans-4-butyl-1-carbobenzoxy-L-proline.

If desired, the hydrogenation of the 4-ylidene group can be postponed until after the acylation step. Also the 1-carbobenzoxy group can be removed by hydrogenation over a palladium-on-carbon catalyst by the process of Part B of Examples 2 and 3, and the 1-hydrogen replaced by the process of Part C of Examples 2 and 3.

By substituting the alkyltriphenylphosphonium bromide of Part A of Examples 2, 3, and 4 by other substituted triphenylphosphonium bromides where the substituent is ethyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl and the isomeric forms thereof; cyclopropyl, cyclobutyl, cyclopentyl, cyclohexyl, cycloheptyl, cyclooctyl, 2-cyclopropylethyl, and 3-cyclopentylpropyl; benzyl, phenethyl, 3-phenylpropyl, and 1-naphthylmethyl, the corresponding 4-alkylidene-, 4-cycloalkylidene-, and 4-aralkylidene - 1 - carbobenzoxy-L-prolines and the corresponding 4-alkyl-, 4-cycloalkyl-, and 4-aralkyl-1-carbobenzoxy-L-prolines are obtained. For example, when the alkyltriphenylphosphonium bromide is substituted by ethyl-, isobutyl-, pentyl-, and hexyltriphenylphosphonium bromides there are obtained 4-ethylidene-, 4-propylidene-, 4-isobutylidene-, 4-pentylidene-, and 4-hexylidene-1-carbobenzoxy-L-prolines, and cis and trans 4-ethyl-, 4-propyl-, 4-isobutyl-, 4-pentyl-, and 4-hexyl-1-carbobenzoxy-L-prolines.

On hydrogenation over palladium as described above the corresponding compounds without the 1-carbobenzoxy group are obtained and by reductive alkylation of the resulting 1-hydrogen compounds as described above the corresponding 1-substituted compounds are obtained.

It is sometimes desirable first to alkylate the B-HTC with one of the intermediate or starting acids C, D, and E and then to carry out the steps necessary to convert the resulting acylates by reductive alkylation and hydrogenation as necessary to produce the final products. The following example is illustrative.

EXAMPLE 5

A. To a solution of 6.3 g. of 4-butyl-1-carbobenzoxy-L-proline (the oil of Example 4) in 175 ml. of distilled acetonitrile cooled to 0° there was added 3.46 ml. of triethylamine followed by 3.34 ml. of isobutyl chloroformate. The mixture was stirred at 0° C. (±3°) for 15 min. A solution of 6.2 g. of β-HTC free base from Part C in 85 ml. of water was added, and the reaction mixture was stirred at 0° C. for 0.5 hr. and at 25° C. for 1 hr. The reaction product was then filtered and dried yielding 2-hydroxyethyl 6,8-dideoxy-6-(1-carbobenzoxy-4-butyl-L-2-pyrrolidinecarboxamido)-7-O-methyl-1-thio - D-erythro-α-D-galacto-octopyranoside free base. Recrystallization from acetonitrile produced crystals of 2-hydroxyethyl 6,8-dideoxy-6-(1-carbobenzoxy-4-butyl-L - 2 - pyrrolidinecarboxamido)-7-O-methyl - 1 - thio - D-erythro-α-D-galacto-octopyranoside free base.

B. *2-hydroxyethyl 6,8-dideoxy-6-(4-butyl-L-2-pyrrolidinecarboxamido)-7-O - methyl-1-thio-D-erythro-α-D-galacto-octopyranoside hydrochloride*

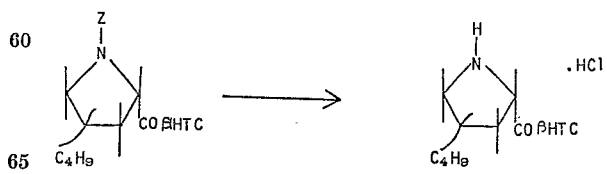

A solution of 7.8 g. of 2-hydroxyethyl 6,8-dideoxy-6-(1-carbobenzoxy-4-butyl-L-2 - pyrrolidinecarboxamido)-7-O-methyl-1-thio-D-erythro-α-D-galacto-octopyranoside free base from Part A in 200 ml. of methanol was shaken over 2 g. of 10% palladium on carbon under 40 lbs. of hydrogen pressure for 17 hours. The catalyst was removed by filtration and the solution concentrated under vacuum. The residue was dissolved in a mixture of 20 ml. of acetone and 20 ml. of water and acidified with 6 N hydrochloric acid. Dilution with 4 volumes of acetone precipitated 2-hydroxyethyl 6,8-dideoxy-6-(4-butyl-L-2-pyrrolidinecarboxamido)-7-O-methyl-1-thio - D-erythro-α-D-galactooctopyranoside hydrochloride which was collected by filtration and dried.

By substituting the 4-butyl-1-carbobenzoxy-L-proline by other 4-alkyl-1-carbobenzoxy-L-prolines where the 4-alkyl is methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl and the isomeric forms thereof; by 4-cycloalkyl-1-carbobenzoxy-L-prolines where 4-cycloalkyl is cyclopropyl, cyclobutyl, cyclopentyl, cyclohexyl, cycloheptyl, cyclooctyl, 2 - methylcyclopentyl, 2,3 - dimethylcyclobutyl, 4-methylcyclobutyl, and 3-cyclopentylpropyl; and by 4-aralkyl-1-carbobenzoxy-L-prolines where 4-aralkyl is benzyl, phenethyl, 3-phenylpropyl, and 1-naphthylmethyl, the corresponding 2-hydroxyethyl 6,8 - dideoxy - 6-(1-carbobenzoxy-4-alkyl, 4-cycloalkyl, and 4-aralkyl-L-2-pyrrolidinecarboxamido)-7-O-methyl-1-thio-D - erythro-α-D-galacto-octopyranosides, and the corresponding 2-hydroxyethyl 6,8-dideoxy-(4-alkyl, 4-cycloalkyl, 4 - aralkyl-L-2-pyrrolidinecarboxamido)-7-O-methyl-1-thio-D - erythro-α-D-galacto-octopyranosides are obtained. For example, by substituting the 4-butyl-1-carbobenzoxy-L-proline by 4-methyl-, 4-ethyl-, 4-propyl-, 4-pentyl-, and 4-hexyl-1-carbobenzoxy-L-prolines, there are obtained 2-hydroxymethyl 6,8 - dideoxy-6-(1-carbobenzoxy-4-methyl-4-ethyl, 4-propyl, 4-pentyl, and 4-hexyl-L-2-pyrrolidinecarboxamido)-7-O-methyl-1-thio-D-erythro-α - D - galacto - octopyranosides; and 2-hydroxyethyl 6,8-dideoxy-6-(4-methyl, 4-ethyl, 4-propyl, 4-pentyl, and 4-hexyl - L - 2 - pyrrolidinecarboxamido)-7-O-methyl-1-thio-D-erythro - α - D - galacto-octopyranosides.

C. *2-hydroxyethyl 6,8-dideoxy-6-(1 - methyl-4-butyl-L-2-pyrrolidinecarboxamido) - 7-O-methyl-1-thio-D-erythro-α-D-galacto-octopyranoside hydrochloride*

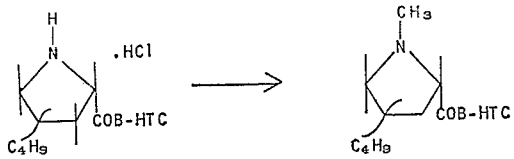

A solution of 2.0 g. of 2-hydroxyethyl 6,8-dideoxy-6-(4-butyl - L - 2 - pyrrolidinecarboxamido)-7-O-methyl-1-thio-D-erythro-α-D-galacto-octopyranoside hydrochloride from Part B and 2.0 ml. of 37% Formalin in 150 ml. of methanol was shaken over 500 mg. of 10% palladium on carbon under 40 lbs. of hydrogen pressure for 3.5 hrs. Removal of the catalyst by filtration and the solvent by distillation in vacuo yielded 2-hydroxyethyl 6,8-dideoxy-6-(1-methyl-4-butyl-L - 2 - pyrrolidinecarboxamido)-7-O-methyl - 1 - thio-D-erythro-α-D-galacto - octopyranoside hydrochloride which by TLC (thin layer chromatography) on silica gel using a mixture of ethyl acetate, acetone, water (8:4:1) for elution and KMnO₄ solution for detection consisted chiefly of two materials, the cis and trans epimers of 2-hydroxyethyl 6,8-dideoxy-6-(1-methyl-4 - butyl-L-2-pyrrolidinecarboxamido)-7-O-methyl-1-thio-D-erythro-α-D-galacto-octopyranoside hydrochloride in a ratio of about 3 to 2. By substituting the formaldehyde of Part C of Examples 2, 3, 4, and 5 by other oxo compounds of the formula R₄R₅CO, for example, acetaldehyde, propionaldehyde, acetone, butyraldehyde, isobutyl methyl ketone, benzaldehyde, phenylacetaldehyde, hydrocinnamaldehyde, acetophenone, propionphenone, butyrophenone, 3 - methyl - 4 - phenyl-2-butanone, 2-methyl-5-phenyl-3-pentanone, 3 - cyclopentanepropionaldehyde, cyclohexaneacetaldehyde, cycloheptanecarboxaldehyde, 2,2-dimethylcyclopropaneacetaldehyde, 2,2-dimethylcyclopropyl methyl ketone, cyclopentyl methyl ketone, cyclobutyl methyl ketone, cyclobutanone, cyclohexanone, and 4-methylcyclohexanone, there are obtained the corresponding 4-alkyl, 4-cycloalkyl, 4-aralkyl-L-prolines and the corresponding 2-hydroxyethyl 6,8-dideoxy-6-[1-R₄R₅CH-(4-alkyl, 4-cycloalkyl-, and 4-aralkyl)-L-2-pyrrolidinecarboxamido]-7-O-methyl - 1 - thio-D-erythro-α-D-galacto-octopyranosides.

I claim:
1. 2 - hydroxyethyl 6-acylamido-6,8-dideoxy-7-O-methyl-1-thio - D - erythro-α-D-galacto-octopyranoside, a compound of the formula:

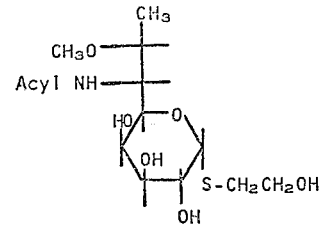

wherein acyl is the acyl radical of a 4-substituted L-proline.

2. The compound of claim 1 wherein acyl is the acyl radical of one of the following carboxylic acids:

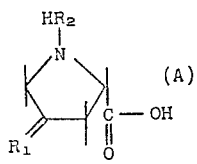 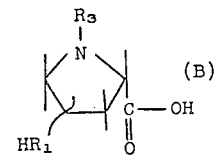

wherein R₁ and R₂ are alkylidene of not more than 20 carbon atoms, cycloalkylidene of from 3 to not more than 8 carbon atoms, aralkylidene of not more than 12 carbon atoms; R₃ is hydrogen or HR₂.

3. The compound of claim 1 wherein acyl is the acyl radical of one of the following carboxylic acids:

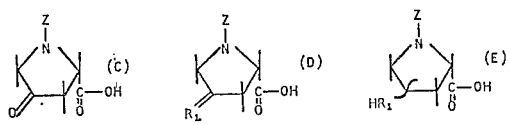

wherein R₁ is alkylidene of not more than 20 carbon atoms, cycloalkylidene of from 3 to not more than 8 carbon atoms, aralkylidene of not more than 12 carbon atoms; and Z is a protective hydrocarbyloxycarbonyl, trityl, diphenyl(p-methoxyphenyl)methyl, benzyl, or p-nitrobenzyl group.

4. 2-hydroxyethyl 6,8 - dideoxy-6-(1-methyl-4-propyl-2 - L - pyrrolidinecarboxamido) - 7 - O - methyl-1-thio-D-erythro - α - D - galacto-octopyranoside, the compound of claim 2 wherein acyl is the acyl radical of an acid of Formula B; HR₁ is trans-propyl, and R₃ is methyl.

5. A process for producing 2-hydroxyethyl 6-acylamido - 6,8 - dideoxy-7-O-methyl-1-thio-D-erythro-α-D-galacto octopyranoside which comprises reacting β-hydroxyethyl thiocelstosaminide in the presence of an acid-binding agent with a mixed anhydride one of whose acyl radicals is the acyl radical of one of the following carboxylic acids of formulas

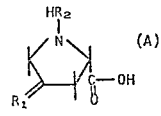 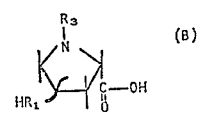

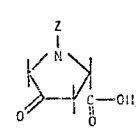 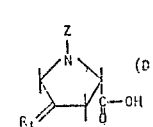 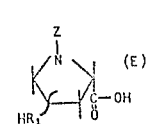

wherein $R_1$ and $R_2$ are alkylidene of not more than 20 carbon atoms, cycloalkylidene of from 3 to not more than 8 carbon atoms, aralkylidene of not more than 12 carbon atoms; $R_3$ is hydrogen or $HR_2$ and the other acyl radical is selected from the group consisting of alkoxycarbonyl, aralkoxycarbonyl, aryloxycarbonyl, benzenesulfonyl, and p-toluenesulfonyl, and Z is a protective hydrocarbyloxycarbonyl, trityl, diphenyl(p-methoxyphenyl)methyl, benzyl, or p-nitrobenzyl group and isolating the 2-hydroxyethyl 6,8-dideoxy-6-acylamido - 7 - O - methyl-1-thio-D-erythro-α-D-galacto-octopyranoside so produced.

6. The process of claim 5 in which the carboxylic acid is trans-1-methyl-4-propyl-L-proline.

References Cited

UNITED STATES PATENTS 3,208,996  9/1965  Hoeksema _____ 260—210

OTHER REFERENCES

Stanek et al., "The Monosaccharides," 1963, page 509, Academic Press, New York, N.Y. (copy in Scientific Library, QD321 S8 C. 2.)

LEWIS GOTTS, *Primary Examiner.*

ELBERT L. ROBERTS, *Examiner.*

J. R. BROWN, *Assistant Examiner.*

UNITED STATES PATENT OFFICE
CERTIFICATE OF CORRECTION

Patent No. 3,364,197

January 16, 1968

Herman Hoeksema

It is hereby certified that error appears in the above numbered patent requiring correction and that the said Letters Patent should read as corrected below.

Column 11, lines 27 and 28, for "2-hydroxymethyl 6,8-dideoxy-6-(1-carbobenzoxy-4-methyl-4-ethyl," read -- 2-hydroxyethyl 6,8-dideoxy-6-(1-carbobenzoxy-4-methyl,4-ethyl, --; same column 11, line 70, for "propionphenone" read -- propiophenone --.

Signed and sealed this 8th day of April 1969.

(SEAL)
Attest:

Edward M. Fletcher, Jr.
Attesting Officer

EDWARD J. BRENNER
Commissioner of Patents